No. 697,084. Patented Apr. 8, 1902.
W. HENDERSON.
HYDRANT.
(Application filed Aug. 24, 1901.)
(No Model.)
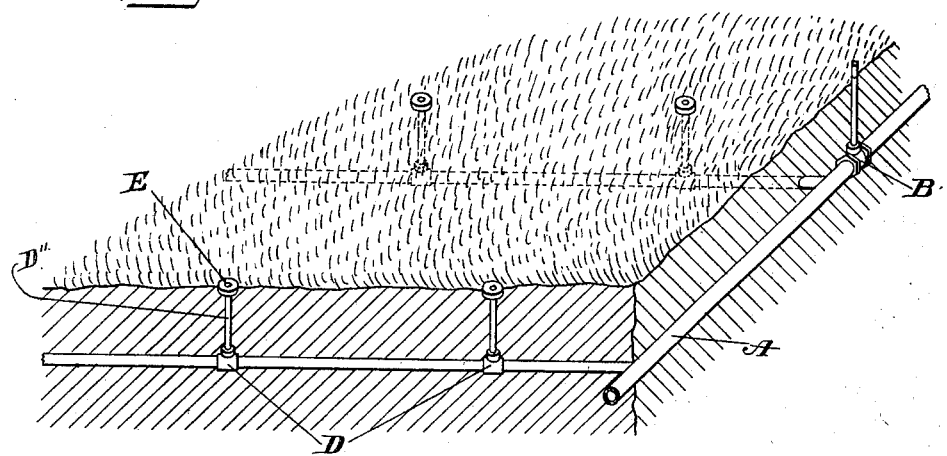
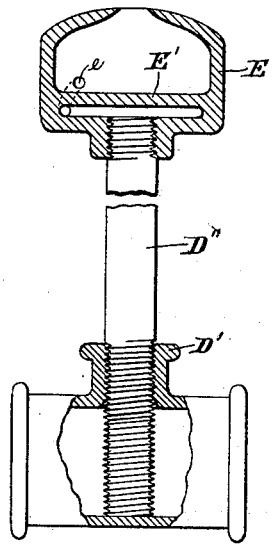
WITNESSES.
Chas. L. Hyde.
Mattie McGinnis.
INVENTOR
William Henderson
BY HIS ATTORNEYS
Hazard & Markham

UNITED STATES PATENT OFFICE.

WILLIAM HENDERSON, OF LOS ANGELES, CALIFORNIA.

HYDRANT.

SPECIFICATION forming part of Letters Patent No. 697,084, dated April 8, 1902.

Application filed August 24, 1901. Serial No. 73,185. (No model.)

*To all whom it may concern:*

Be it known that I, WILLIAM HENDERSON, a citizen of the United States, residing at Los Angeles, in the county of Los Angeles, State of California, have invented new and useful Improvements in Hydrants, of which the following is a specification.

My invention relates to hydrants for regulating the flow of water in an irrigating system, it being peculiarly useful as applied to lawns; and the object thereof is to provide a hydrant of simple construction, with few parts, and which can easily be regulated. I accomplish this object by the hydrant described herein and illustrated in the accompanying drawings, in which—

Figure 1 is a section of a lawn, showing my hydrant applied to the irrigating pipe system thereof. Fig. 2 is a side view, partly in section, of one of my hydrants.

In the drawings, A represents the water-main, on which is cock B to control the passage of water therethrough. Connected with the main are the lateral distributing-pipes C, which at suitable distances apart are supplied with my improved hydrants D. These hydrants are formed of a base D', which is an ordinary T of suitable size for coupling the joints of the distributing-pipe together, having an outlet for the reception of the stand-pipe D'', which is threaded on its lower end, so that it may be screwed into the base until the lower end contacts with the base, and a sprayer E, having web E' separating the water-chamber into two parts, which are in communication through passage e, which is screwed upon the top of the stand-pipe. The sprayer E in lawns is usually placed at the surface of the ground, so as not to interfere with the mowing thereof. If desired, the stand-pipe may be turned and the longer threaded end may be at the top and the sprayer may be screwed down until the end of the pipe contacts with the web E' of the sprayer. When any other form of water-distributer is used, a projecting part is provided which will cover the end of the stand-pipe when screwed down thereon, and thus control the flow of water through the stand-pipe and distributer.

In the operation of my hydrants the stand-pipe is rotated to withdraw the lower end thereof away from the inner side of the base to permit the desired quantity of water to pass up the same. After the hydrant has been once regulated it requires no further care, as the water is turned on and cut off the lawn by the stop-cock B.

It will be seen that by my construction I utilize the ordinary T-coupling and stand-pipe and water-distributer by a slight change thereof, involving practically no additional expense, to form a hydrant and dispense with the ordinary stand-pipe regulating-valve, thereby saving that much expense and also dispensing with the hole in the lawn required for access thereto, as my stand-pipe can be rotated by the spraying attachment or the spraying attachment may be rotated on the stand-pipe to increase or decrease the flow of water through the stand-pipe.

Where my hydrant is used at the end of a distributing-pipe, a properly-constructed elbow, which would permit the stand-pipe to be screwed into it far enough to regulate the flow of the water, could be used.

Having described my invention, what I claim as new, and desire to secure by Letters Patent, is—

In an irrigating-hydrant, a nozzle therefor composed of two circular chambers, disposed one above the other; the upper chamber having a centrally-disposed circular opening with sharp edges in the top thereof; and the lower chamber having a centrally-disposed circular threaded opening in the bottom thereof; an oblique passage connecting said two chambers, commencing at one side of the opening in the lower chamber, in combination with a stand-pipe, adapted to be screwed into the lower chamber to contact with the web separating the two chambers.

In witness that I claim the foregoing I have hereunto subscribed my name this 15th day of August, 1901.

WILLIAM HENDERSON.

Witnesses:
G. E. HARPHAM,
MATTIE MCGINNIS.